United States Patent
Hobson

(10) Patent No.: US 7,694,178 B2
(45) Date of Patent: Apr. 6, 2010

(54) METHOD, APPARATUS AND COMPUTER PROGRAM PRODUCT FOR TRANSACTION RECOVERY

(75) Inventor: Steve J Hobson, Middlesex (GB)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 11/776,166

(22) Filed: Jul. 11, 2007

(65) Prior Publication Data
US 2008/0040717 A1 Feb. 14, 2008

(30) Foreign Application Priority Data
Aug. 12, 2006 (GB) ................. 0616068.3

(51) Int. Cl.
*G06F 11/00* (2006.01)
(52) U.S. Cl. ....................................... 714/16
(58) Field of Classification Search ............ 714/16
See application file for complete search history.

(56) References Cited

U.S. PATENT DOCUMENTS

| 4,697,266 | A * | 9/1987 | Finley ............... 714/16 |
| 6,671,704 | B1 * | 12/2003 | Gondi et al. ............ 707/204 |
| 7,590,983 | B2 * | 9/2009 | Neiman et al. ........... 718/100 |
| 2002/0066051 | A1 * | 5/2002 | Hobson et al. ........... 714/16 |
| 2003/0041285 | A1 * | 2/2003 | Chen et al. ............... 714/16 |
| 2004/0255298 | A1 * | 12/2004 | Dorrance et al. ........... 718/101 |
| 2006/0271814 | A1 * | 11/2006 | Fung et al. ............... 714/4 |
| 2009/0193286 | A1 * | 7/2009 | Brooks et al. ........... 714/2 |

OTHER PUBLICATIONS

Xiaolan Zhang, et al., HACC: An Architecture for Cluster-Based Web Servers; Proceedings of the 3rd Usenix Windows NT Symposium, Seattle, Washington, USA Jul. 12-13, 1999.

* cited by examiner

*Primary Examiner*—Michael C Maskulinski
(74) *Attorney, Agent, or Firm*—David A. Mims, Jr.

(57) ABSTRACT

Method, apparatus and computer program product for transaction resolution in a system comprising a transaction manager, a plurality of resource managers and a connection distributor for distributing transaction requests from the transaction manager amongst the plurality of resource managers. The transaction manager is allocated a first resource manager via which to conduct its transactions and the first resource manager has a transaction resolution queue associated with it. The system also comprises an asynchronous messaging infrastructure able to transmit messages originating at the transaction manager to the transaction resolution queue. The resource managers may comprise part of the asynchronous messaging infrastructure. Responsive to a failure between the transaction manager and the first resource manager, state data is received from the transaction manager at a second resource manager, the state data being addressed to the transaction resolution queue. The state data is delivered to the transaction resolution queue using the asynchronous messaging infrastructure.

15 Claims, 7 Drawing Sheets

1

METHOD, APPARATUS AND COMPUTER PROGRAM PRODUCT FOR TRANSACTION RECOVERY

FIELD OF THE INVENTION

The invention relates to the field of transaction recovery.

BACKGROUND OF THE INVENTION

In computer systems which are configured as server clusters and are accessed by client computers over TCP/IP connections, a common approach to workload balancing is to distribute connections from client computers to the computers in a server cluster.

It is possible to include software in each client computer which is able to select a server at random from a set of available servers. However, it is often preferred that connection distribution is managed by a specialised intermediary computer. Thus as shown in FIG. 1, a client computer 10, 20, 30, 40 connects first to a connection distributor 50 which selects a server 65, 70, 75, 80 from the available servers in server cluster 60 and redirects the client's connection to the selected server computer 70.

A variety of connection distribution systems, often called IP-sprayers, are available. Several examples are listed in HACC: An Architecture for Cluster-Based Web Servers atwww.eecs.harvard.edu/~margo/papers/nt99-hacc/paper.html.

A particular problem with this type of configuration arises when the client computer is using distributed two-phase commit transactions. A transaction manager (either running on the client or in communication with the client) is responsible for co-ordinating the client's requests in the form of transactions.

If a failure occurs while a transaction is in-doubt then transactional recovery (forward completion or roll back of the in-doubt transaction) requires the transaction manager at the client end to communicate with the server instance having in-doubt transactions. If the client attempts to reconnect through the connection distributor, it may however connect to a different server instance.

A variety of techniques can be used to alleviate this problem. These include:

(i) The client can check that it has reconnected to the right server instance. If not, it can disconnect and try again repeatedly until (hopefully) it eventually strikes lucky.

There are a number of obvious disadvantages with this, including:

If the server cluster contains a large number of server instances, the retry process may take an unacceptably long time and/or use an unacceptable amount of resource. This is particularly true if the server restart is delayed—for example, while failed hardware is replaced; and If the server instance has been deleted, the retry process will continue fruitlessly forever.

(ii) The client can obtain connection details (host and port) for the server instance when asking a server to process a transaction. When a failure occurs, the client can reconnect directly to the required server instance, bypassing the connection distributor.

This does not work in some situations, for example:

The installation might not permit direct connection to a server instance;

A failed server instance might restart on a different machine (with a different host/port); and There is no obvious way for the client to know if the server instance has been deleted (in which case the client must abandon attempts to reconnect).

(iii) The connection distributor can be given transactional awareness or other affinity-type capabilities so that it can provide reconnection to the failed server instance.

This approach has disadvantages that include:

It requires the customer to use a proprietary connection distributor. This is likely to restrict severely the appeal of such a solution;

It requires the connection distributor to include potentially complex and highly specific "knowledge" of the systems using it. For example, the way a particular server instance can be identified is (in general) specific to that service and the protocol used to connect to the server; and The client still faces the same problems mentioned above if restarting the server takes a long time or if the server instance never gets restarted.

SUMMARY OF THE INVENTION

According to a first aspect, the invention provides a method for transaction resolution in a system comprising a transaction manager, a plurality of resource managers and a connection distributor for distributing transaction requests from the transaction manager amongst the plurality of resource managers, wherein the transaction manager is allocated a first resource manager via which to conduct its transactions, the first resource manager having a transaction resolution queue associated therewith, the system comprising an asynchronous messaging infrastructure able to transmit messages originating at the transaction manager to the transaction resolution queue, the method comprising: responsive to a failure between the transaction manager and the first resource manager, receiving state data from the transaction manager at a second resource manager, the state data being addressed to the transaction resolution queue; delivering the state data to the transaction resolution queue using the asynchronous messaging infrastructure; detecting that the transaction resolution queue has received state data; and retrieving the state data in order to enable the first resource manager to perform transaction resolution.

A request may be received from the transaction manager for a transaction resolution queue to use and details are then preferably provided. In another embodiment the transaction resolution queue may conform to a prearranged format.

In one embodiment, the resource managers comprise queue managers in the asynchronous messaging infrastructure.

In one embodiment the transaction resolution queue contains at least two pieces of state data referring to the first resource manager and this state data is processed by the first resource manager in the order in which the state data was sent by the client's transaction manager. This may mean that the messaging infrastructure guarantees the order by transmitting the state data to the first resource manager in the correct sequence or the first resource manager may have to rearrange the processing order itself. By way of example, a sequence number or a timestamp may be used to determine in what order to send/process the state data.

In one embodiment, the transaction resolution queue may contain pieces of state data associated with a plurality of resource managers. In this embodiment it is necessary to determine which state data is applicable to the first resource manager.

In one embodiment, the first resource manager is provided with enough detail such that the resource manager is able to use the state data to perform transaction resolution. For example, information may be provided so that the resource manager can determine whether a given transaction id is for a transaction managed by the transaction manager.

According to a second aspect, there is provided an apparatus for transaction resolution in a system comprising a transaction manager, a plurality of resource managers and a connection distributor for distributing transaction requests from the transaction manager amongst the plurality of resource managers, wherein the transaction manager is allocated a first resource manager via which to conduct its transactions, the first resource manager having a transaction resolution queue associated therewith, the system comprising an asynchronous messaging infrastructure able to transmit messages originating at the transaction manager to the transaction resolution queue, the apparatus comprising: means, responsive to a failure between the transaction manager and the first resource manager, for receiving state data from the transaction manager at a second resource manager, the state data being addressed to the transaction resolution queue; means for delivering the state data to the transaction resolution queue using the asynchronous messaging infrastructure; means for detecting that the transaction resolution queue has received state data; and means for retrieving the state data in order to enable the first resource manager to perform transaction resolution.

The invention may be implemented in computer software.

BRIEF DESCRIPTION OF THE DRAWINGS

A preferred embodiment of the present invention will now be described, by way of example only, and with reference to the following drawings.

DETAILED DESCRIPTION

As alluded to above, the invention concerns itself with the situation in which a failure occurs resulting in a loss of connectivity between a client's transaction manager and a resource manager (running on a server). "Failure" here refers to a hardware or software component problem which breaks the logical connection from the client's transaction manager to the resource manager. This may be as a result of a transaction manager/resource manager outage, a broken connection between the two, a client outage where the transaction manager runs on the client, or other similar failures.

When connectivity is lost, the resource manager may be in the middle of processing at least some transactions initiated by the transaction manager. Those transactions which have been prepared but have not finally been committed or rolled back are said to be "in-doubt". It is important that when connectivity is re-established such in-doubt transactions are correctly processed.

Figure 2:
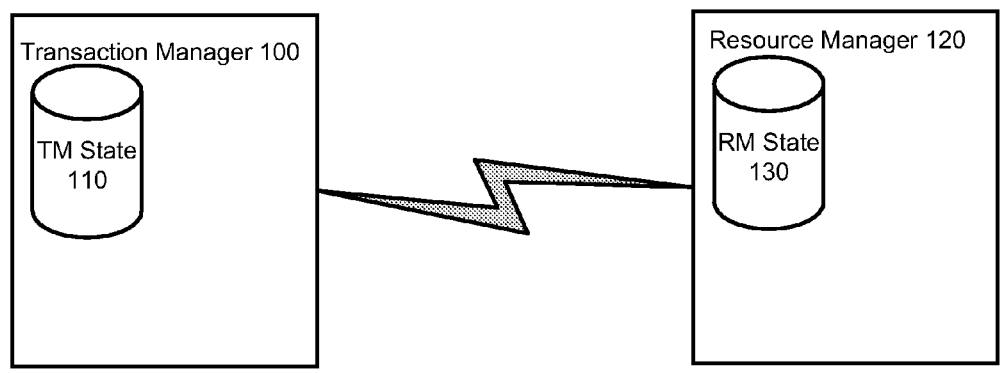
FIG. 2 illustrates transaction recovery in a system having a direct connection between a transaction manager and a resource manager.

FIG. 2 shows the scenario where there is a direct connection between a transaction manager 100 and a resource manager 120. Transaction manager 100 has access to state information (data) 110 including details of all the transactions that the transaction manager currently knows about. Resource manager 120 also has access to state information 130 with details of all the transactions that it knows about. When the connection between the transaction manger 100 and the resource manager 120 is resumed following a failure, the transaction manager typically contacts the resource manager to ask for a list of its in-doubt transactions. Resource manager 120 retrieves such information from its state 130 and sends such details to the transaction manager 100. The transaction manager can then compare its state data 110 with the resource manager's state data 130 (list of in-doubt transactions). The transaction manager may then do any of the following:

1) Disregard those transactions for which it is not the transaction manager;

2) Request that the resource manager commits those transactions which the transaction manager's state data indicates should be committed and aborts those which the transaction manager's state data indicates should be aborted; and 3) Some transactions will remain in-doubt because their outcome is still pending according to the transaction manager's state data;

Thus, when there is a direct connection between a transaction manager and a resource manager, it is a relatively simple process to implement recovery following a failure.

Figure 1:
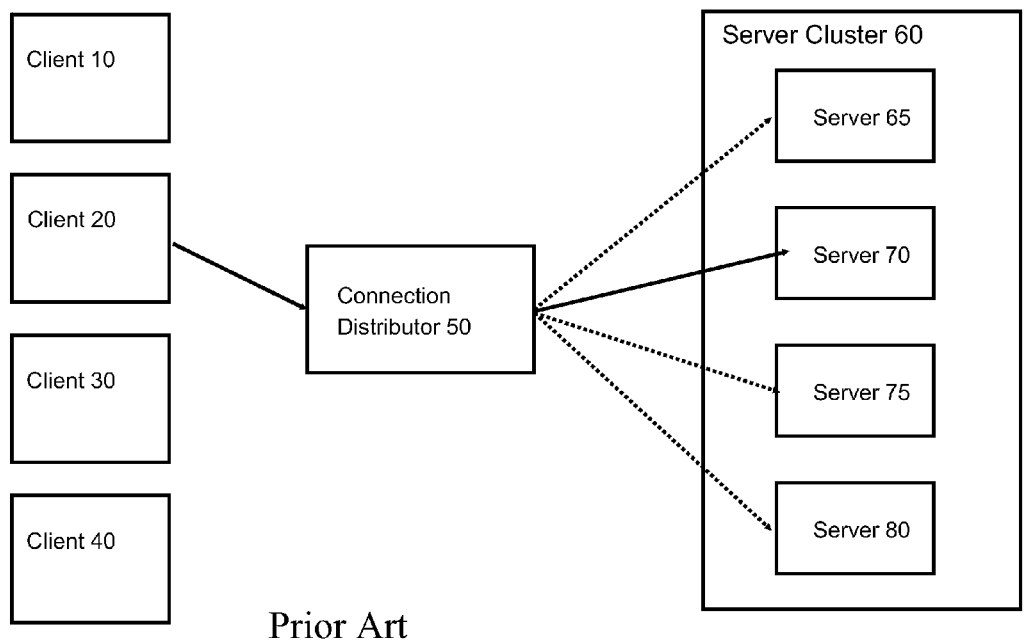
FIG. 1 illustrates a prior art workload distribution mechanism.

As indicated in the background section and as shown in FIG. 1, a connection distributor is often employed between a transaction manager and a cluster of servers comprising resource managers. In such an environment, it is very likely that a transaction manager will be attached to a different server upon reconnection. This makes transaction resolution a much more difficult prospect.

Figure 3A:
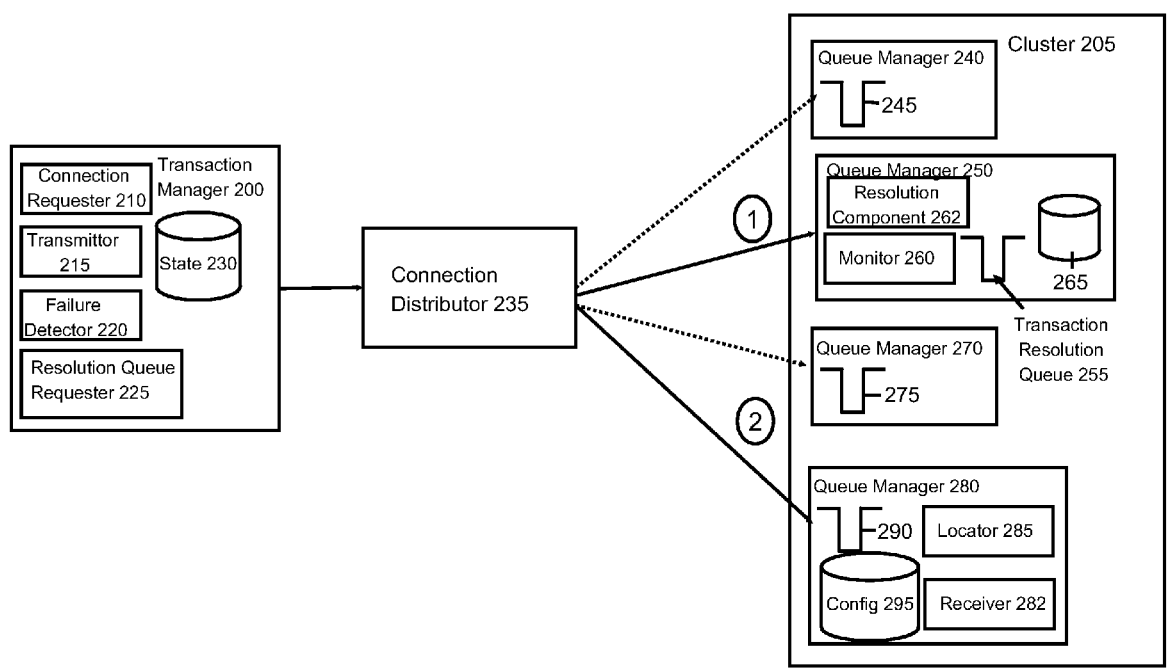
FIG. 3a is a component diagram of the present invention in accordance with a preferred embodiment.
Figure 3B:
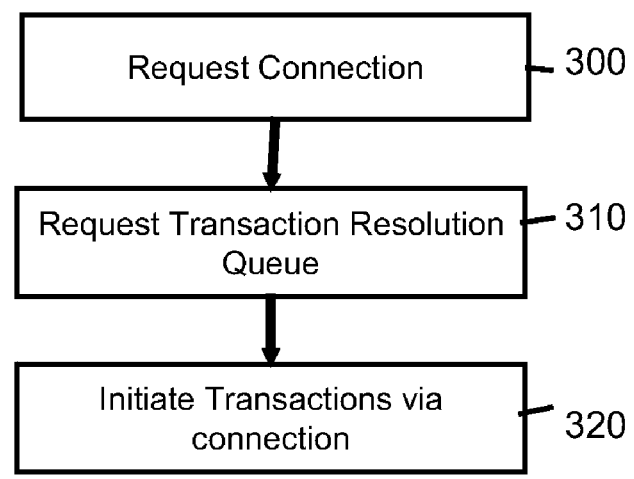
FIGS. 3b, 3c, 3d and 3e shown the processing performed in accordance with a preferred embodiment of the present invention.
Figure 3C:
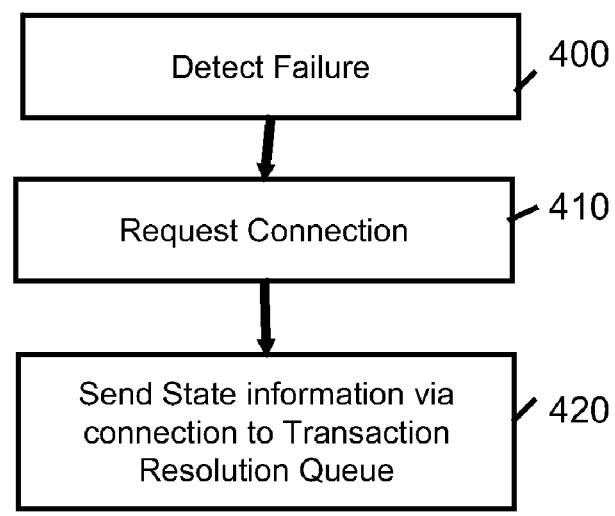
Figure 3D:
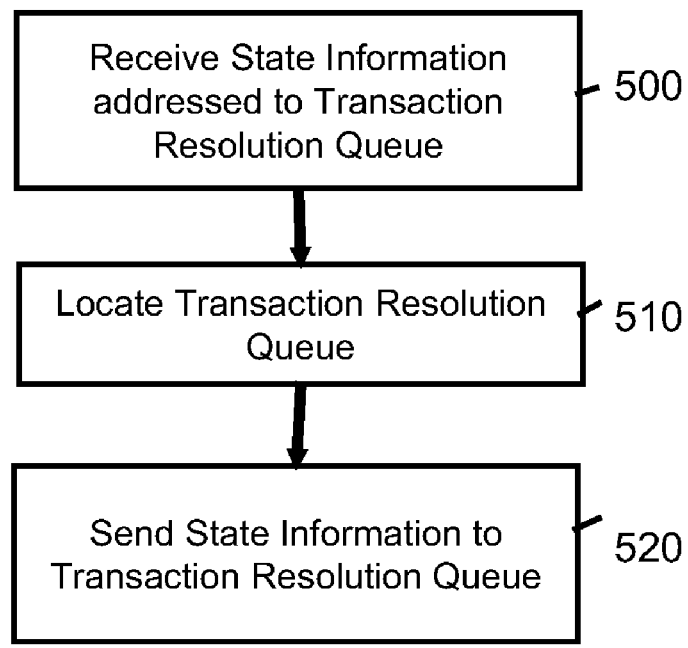
Figure 3E:
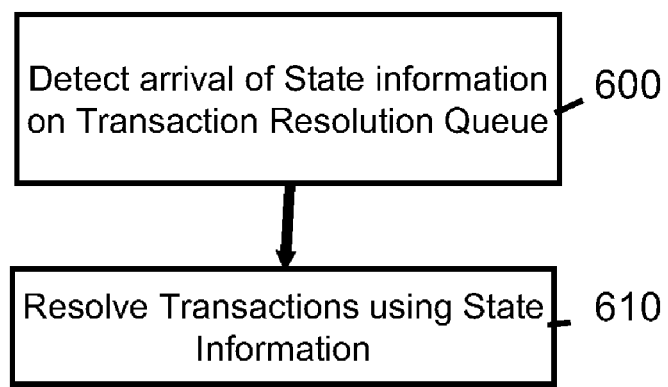

FIG. 3a is a component diagram of the solution proposed by the present invention, in accordance with a preferred embodiment. FIGS. 3b, 3c, 3d and 3e illustrate the processing that occurs at the transaction manager and resource manager in accordance with a preferred embodiment of the present invention. The figures should be read in conjunction with one another.

Transaction manager 200 requests a connection using connection requester 210 to a queue manager 240, 250, 270, 280 within cluster 205 (step 300). This request is received by connection distributor 235 which selects a queue manager 250 from the set in cluster 205. The connection distributor may be a separate intermediary computer or may form part of the client or client's transaction manager. Once the transaction manager has the details of the selected queue manager, details of a transaction resolution queue 255 local to that queue manager 250 can be requested (and received) via resolution queue requester 225 (step 310). Transactions can then be initiated via the connection (step 320). State information 230 is maintained as to the status of all such transactions.

Step 310 is optional. In some embodiments, it is possible to reserve a queue name (e.g. system.tran.resolve.queue) and to insist that this is qualified by the name of the queue manager. Thus it might only be necessary to be aware of the queue manager to which the transaction manager is connected because the same name is always used for the transaction resolution queue.

At some point subsequently the connection may be lost. Such a failure is detected by failure detector 220 at step 400. As soon as is possible, a new connection is requested using component 210 (step 410). The process only differs when the failure includes failure of the transaction manager itself. For that case, the transaction manager (in accordance with standard practice) attempts to establish a new connection using component 210 as soon as possible following its own restart.

It can be seen from FIG. 3a that upon requesting a new connection, the transaction manager is connected to queue manager 280 instead of queue manager 250. The problem here is that it is queue manager 250 that holds state information 265 regarding the transactions it is processing on behalf of the transaction manager 200. Queue manager 280 is unable to resolve the in-doubt transactions owned by queue manager 250.

At step 320 state information about the transactions being processed by the transaction manager on behalf of queue manager 250 is sent to a transmission queue 290 by transmitter component 215 (step 420).

The state information 230 is received at queue manager 280 by receiver component 282. The information is addressed to transaction resolution queue 255 but since this queue is not local to the receiving queue manager, the receiver component places the state information on local transmission queue 290. Locator 285 uses configuration information 295 to locate the named transaction resolution queue (step 510). Component 285 then retrieves the state information from queue 290 and sends such data to the located transaction resolution queue (step 520).

Queue manager 250 owns the transaction resolution queue 255. Monitor 260 therefore detects the arrival of state information 230 on transaction resolution queue 255 (step 600). Monitor 260 informs resolution component 262 that state information is available and component 262 uses this information to resolve any in-doubt transactions. In other words, state information 230 contains details of each transaction that transaction manager 200 is aware of and the intended action for such transactions. Queue manager 250 can use this information in conjunction with the state information 265 that it holds which list the transactions being coordinated by transaction manager 200.

Thus an asynchronous reliable messaging infrastructure can be used to locate a transaction resolution queue from which state information can be retrieved and used to resolve transactions for which the status is in-doubt. The transaction manager's state information enables the resolution component to determine whether a transaction should be forward completed, aborted, or should remain in-doubt.

It will be appreciated that the transaction manager runs or is in communication with a client, whilst a queue manager runs on a server and is an example of a resource manager. The resource manager typically is hosted by a server. In another embodiment, an application (such as a database manager) runs on a server as a resource manager and communicates with a queue manager and its queues.

The solution described herein is advantageous for the following reasons:
  It works with generic IP technology such as IP-sprayers and the z/OS® sysplex distributor (z/OS is a trademark of International Business Machines Corporation in the United States, other countries, or both);
  Installations using this solution can continue to benefit from features of these existing technologies such as the sophisticated load balancing capabilities of the z/OS sysplex distributor;
  When recovering from an outage, a client's transactional recovery process can complete as soon as it has passed the resolved state to the reliable messaging infrastructure;
  The problem of locating the correct server instance is entirely handled by the reliable messaging infrastructure. The client and the server need only agree upon a queue to which the client's transaction manager can send transaction state information for use by the server (resource manager).
  Problems such as deletion of the server instance are handled by standard administrative features or procedures (or both) of the reliable messaging infrastructure. The client's transactional recovery process is relieved of responsibility for handling them.

Transaction resolution occurs in the usual way, without involving the transaction resolution queue or the transaction resolution monitor unless and until a failure occurs while one or more transaction are in-doubt.

To summarise:
  1. A new connection is established to the reliable messaging system;
  2. A message is constructed (state information) which identifies the transactions (for example, by XA XIDs) and indicates the resolved state (forward completion or roll back) for each;
  3. The transaction manager addresses the message to the appropriate transaction resolution queue and the message is accepted by the reliable messaging system; and
  4. The transaction manager proceeds as if the queue manager to which it was originally connected (prior to a failure) had acknowledged receipt of the resolved state, safe in the knowledge that the reliable messaging infrastructure will deliver the state to the appropriate queue manager holding the appropriate transaction resolution queue.

There is also the case where the client's transaction manager fails. When the transaction manager restarts, standard transactional practice is to have the transaction manager identify (from its log) and attempt to contact any resource managers involved in prepared transactions (obviously, this excludes transactions where all the resource managers are known to have received the resolution). Each resource manager is then asked to provide a list of its in-doubts (as discussed with reference to FIG. 2). This achieves the following:
  The transaction manager can identify transactions which no resource manager is in-doubt about—it can then "forget" these transactions.
  The transaction manager can identify transactions which one or more resource manager is in-doubt about—it can then inform these resource managers of the transaction outcome.

For the solution disclosed herein, the resource manager cannot be contacted directly. In summary, the transaction manager does the following:
  1. It establishes a new connection to the reliable messaging system;
  2. It constructs a message which identifies all the transactions which the resource manager may have in-doubt and indicates the resolved state for each;
  3. It sends the message to the appropriate transaction resolution queue via the reliable messaging infrastructure; and
  4. It proceeds as if the original queue manager has acknowledged receipt of the resolved state.

Observe that, the client-side transaction manager can meet its obligations to inform the server-side resource manager of the resolved state of any server-side resource manager in-doubts even when the client side cannot establish contact with the original server side resource manager.

It will be appreciated that in the example described herein, the queue manager occupies both the role of the resource manager and the role of the reliable messaging infrastructure. In a more general case, the two roles would be separate—for example, the resource manager might be a relational database manager. In this case, state information would be sent by the transaction manager to the resource manager's transaction resolution queue using the reliable messaging infrastructure.

It will be appreciated that whilst FIG. 3a shows only one of everything, each queue manager will have at least a transaction resolution queue, a monitor, a locator, and configuration information.

The IBM® WebSphere® MQ product (IBM and WebSphere are trademarks of International Business Machines Corporation in the United States, other countries, or both) can be used to provide the reliable messaging infrastructure discussed above. WebSphere MQ on the z/OS platform has the concept of "queue-sharing groups". This is an example of a "server cluster" as discussed above. The z/OS sysplex distributor is used as a specific example of the "connection distributor", as discussed above. The sysplex distributor presents a single access point (host and port) to which the client (its transaction manager) connects. For each connection request, the sysplex distributor selects a particular queue manager in the queue-sharing group and reroutes the connection to the queue manager. In a queue sharing group, a shared queue can be nominated as the transaction resolution queue. A shared queue is accessible directly by any queue manager in the group. Looking at FIG. 3a, queue manager 280 can put state information directly onto this queue (bypassing queue 290) and queue manager 250 can then access this information.

When the resource manager is a WebSphere MQ queue manager, a simple way to associate a transaction resolution queue with a server is to reserve a queue name—e.g. "system.tran.resolve.queue". A local queue with this name is created on each WebSphere MQ queue manager. When the server is not a WebSphere MQ queue manager, the precise name of the transaction resolution queue being used by a particular resource manager will preferably need to be requested by the transaction manager or prearranged. If the queue name is prearranged, then it preferably includes the name of the resource manager and may be qualified by a queue manager name. The resource manager itself will be aware of how to contact the queue that it is using.

It will be appreciated that every time a failure occurs, new state information will be transmitted to the appropriate transaction resolution queue. It is important (especially if such failures occur within close succession) that such state information is processed in the correct order. This can be achieved by the client's transaction manager associating a sequence number with each piece of state data. In an alternative embodiment, each piece of state data could be time-stamped by the transaction manager. Another option is for the messaging infrastructure to guarantee the order of the state data (possibly by using one of the methods just described).

With the z/OS queue sharing group facility, an IP Sprayer may deliver a message to one of a set of queue managers and each queue manager will eventually deliver the message to the same queue. Ordering is guaranteed with such a technology because when the client's transaction manager connects to a z/OS queue sharing group to PUT its transaction resolution information onto a transaction resolution queue which is a shared queue, the queue manager (which may be any of the queue managers in the queue sharing group) adds the message to the queue immediately. This guarantees that the state data is added to the transaction resolution queue in the correct order. By way of example, suppose the client's transaction manager PUTs a state data message to the queue; the message is added to the queue immediately. If it subsequently PUTs a second state data message to the queue; the second message will be added after the first (unless the first has already been processed by the server).

Note, a queue manager receiving state data has to be able to understand the meaning of that state data. This works well when the transaction manager and queue manager are using the same protocol. In some cases however, it may be necessary to include information which enables the resource manager to determine whether a given transaction id is for a transaction managed by the transaction manager (as opposed to a different transaction manager).

Note each resource manager does not have to have its own uniquely nominated transaction resolution queue. It is only important that each resource manager can identify the state data that belongs to it. For example, in IBM's WebSphere MQ, messages can be marked with a correlation identifier which uniquely identifies the intended recipient of the message. The client's transaction manager can use this facility to identify state data messages so that each resource manager only GETs the messages intended for it.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system, (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description but is not intended to exhaust or limit the invention in the form disclosed. Many modifications and variations will be apparent to those of ordinary skill in the art. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of transaction resolution in a data processing system comprising a transaction manager, a plurality of resource managers and a connection distributor for distributing transaction requests from the transaction manager amongst the plurality of resource managers, wherein the transaction manager is allocated a first resource manager via which to conduct its transactions, the first resource manager having a transaction resolution queue associated therewith, the system comprising an asynchronous messaging infrastructure able to transmit messages originating at the transaction manager to the transaction resolution queue, the method comprising:

responsive to a failure between the transaction manager and the first resource manager, receiving state data from the transaction manager at a second resource manager, the state data being addressed to the transaction resolution queue;

delivering the state data to the transaction resolution queue using the asynchronous messaging infrastructure;

detecting that the transaction resolution queue has received state data; and retrieving the state data in order to enable the first resource manager to perform transaction resolution.

2. The method of claim 1 further comprising:

receiving a request for the transaction resolution queue to use from the transaction manager; and providing the transaction manager with details pertaining to the transaction resolution queue.

3. The method of claim 1, wherein the resource managers comprise queue managers in the asynchronous messaging infrastructure.

4. The method of claim 1, wherein the transaction resolution queue contains at least two pieces of state data referring to the first resource manager, the method further comprising:

processing the state data in the order in which the state data was sent by a client's transaction manager.

5. The method of claim 4, wherein the processing step uses either a sequence number or a timestamp to determine in what order to process the state data.

6. The method of claim 1, wherein the transaction resolution queue contains pieces of state data associated with the plurality of resource managers, the step of retrieving the state data in order to enable the first resource manager to perform transaction resolution further comprising:

determining which state data is applicable to the first resource manager.

7. The method of claim 1 further comprising:

providing the first resource manager with enough detail such that the resource manager is able to use the state data to perform transaction resolution.

8. Apparatus for transaction resolution in a system comprising a transaction manager, a plurality of resource managers and a connection distributor for distributing transaction requests from the transaction manager amongst the plurality of resource managers, wherein the transaction manager is allocated a first resource manager via which to conduct its transactions, the first resource manager having a transaction resolution queue associated therewith, the system comprising an asynchronous messaging infrastructure able to transmit messages originating at the transaction manager to the transaction resolution queue, the apparatus comprising:

receiving means, responsive to a failure between the transaction manager and the first resource manager, for receiving state data from the transaction manager at a second resource manager, the state data being addressed to the transaction resolution queue;

delivering means for delivering the state data to the transaction resolution queue using the asynchronous messaging infrastructure;

detecting means for detecting that the transaction resolution queue has received state data; and retrieving means for retrieving the state data in order to enable the first resource manager to perform transaction resolution.

9. The apparatus of claim 8 further comprising:

receiving means for receiving a request for the transaction resolution queue to use from the transaction manager; and providing means for providing the transaction manager with details pertaining to the transaction resolution queue.

10. The apparatus of claim 8, wherein the resource managers comprise queue managers in the asynchronous messaging infrastructure.

11. The apparatus of claim 8, wherein the transaction resolution queue contains at least two pieces of state data referring to the first resource manager, the apparatus comprising:

means for processing the state data in the order in which the state data was sent by a client's transaction manager.

12. The apparatus of claim 11, wherein the processing means uses either a sequence number or a timestamp to determine in what order to process the state data.

13. The apparatus of claim 8, wherein the transaction resolution queue contains pieces of state data associated with the plurality of resource managers, the means for retrieving the state data in order to enable the first resource manager to perform transaction resolution further comprising:

determining means for determining which state data is applicable to the first resource manager.

14. The apparatus of claim 8, further comprising:

providing means for providing the first resource manager with enough detail such that the resource manager is able to use the state data to perform transaction resolution.

15. A computer program product comprising a computer readable medium having computer program instructions adapted to perform a method of claim 1 when said computer program instructions are run on a computer.

* * * * *